Oct. 20, 1953          H. A. GRAY, JR          2,655,848

AUTOMATICALLY CONTROLLED PHOTOELECTRIC IRIS

Filed Feb. 9, 1950          2 Sheets-Sheet 1

INVENTOR.
HOWARD A. GRAY, JR.
BY
ATTORNEY

Oct. 20, 1953   H. A. GRAY, JR   2,655,848
AUTOMATICALLY CONTROLLED PHOTOELECTRIC IRIS
Filed Feb. 9, 1950   2 Sheets-Sheet 2

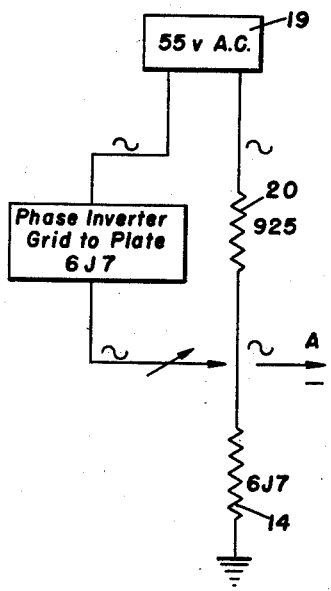

Static Condition
Superimposed A.C. exactly
balanced out by phase
inverter. Output at A
Zero Volts A.C.

FIG 3a

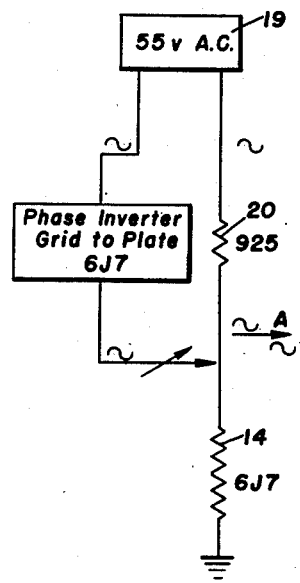

Light increased to
Photo Electric Cell
Superimposed A.C. not balanced out. Output at A
in phase with supply.

FIG. 3b

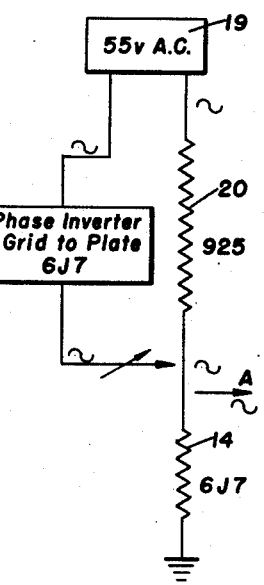

Light decreased to
Photo Electric Cell
A.C. over compensated.
Output at A 180° out of
phase with supply.

FIG. 3c

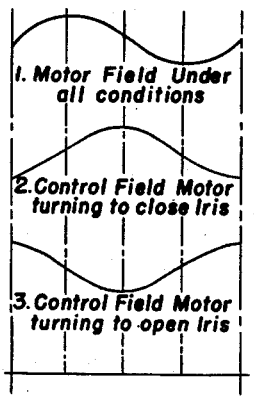

FIG. 4

INVENTOR.
HOWARD A. GRAY, JR.
BY G. D. O'Brien
ATTORNEY

Patented Oct. 20, 1953

2,655,848

UNITED STATES PATENT OFFICE 2,655,848

AUTOMATICALLY CONTROLLED PHOTOELECTRIC IRIS

Howard A. Gray, Jr., Washington, D. C., assignor to the United States of America as represented by the Secretary of the Navy Application February 9, 1950, Serial No. 143,211

7 Claims. (Cl. 95—64)

The present invention relates in general to the art of photography, as it pertains to the obtaining of flight test information relating to small, high velocity test vehicles by motion picture camera tracking. More particularly, the invention relates to an improved system and apparatus for automatically controlling an iris diaphragm for motion picture and other types of cameras.

The technique of obtaining flight test information on small, high velocity test vehicles by motion picture camera tracking presents a number of difficult problems in photography. One of these is brought about by the fact that the light intensity of the background varies over a wide latitude from one part of the trajectory to another. For example, from a cine-theodolite station on the flank of a firing range, the vehicle may be tracked through nearly 180° of train, where the light intensity of the sky background on a normal day may vary from 20 to 70 as read on a conventional photometer. This constitutes a change of 4.5 stops of film exposure, and there are very few films which have a wide enough sensitivity latitude statically to bridge this gap in exposure. No film used, up to the present time, will span this exposure range and give satisfactory, analyzable results. The procedure in use, up to the present time, to overcome this problem, has been to set the lens stop at a fair average for the conditions to be encountered throughout the trajectory of the test vehicle. As a result, nearly 50 per cent of the film footage was either under or over exposed to the extent that analysis was extremely difficult or entirely impossible. It is impractical to adjust manually the exposure factor while tracking high speed vehicles.

One of the principal objects of the present invention, therefore, is to provide a system and apparatus for automatically controlling an iris diaphragm designed to surmount the difficulties of making motion picture tracking films of small, high velocity test vehicles against a background of varying light intensity.

As another object, the invention provides an arrangement whereby a selected stop setting, compatible with film sensitivity and exposure time, can be automatically varied to hold the exposure within the necessary latitude through the various background intensities.

A further object of the invention resides in the provision of an automatically controlled iris diaphragm arrangement including a photoelectric cell and an amplifier, wherein the photoelectric cell and amplifier input stage vacuum tube have good enough voltage vs. current characteristics, and are so interconnected, that when alternating current (A. C.) is superimposed from an outside source, an A. C. error signal having the desired characteristics for an A. C. servo system, will be produced.

Another object of the invention is to provide a system and apparatus of the character above-mentioned which will be relatively simple in arrangement and capable of easy adjustment to coincide with the proper iris opening for the film or plate and the shutter speed in use.

Another object of the invention is to provide iris diaphragm control structure which may be readily adapted for use with standard camera equipment.

Other objects of the invention will appear as the description proceeds.

In the drawings:

Figures 3a, 3b and 3c are schematic views showing the equivalent circuits of a photoelectric cell and a first amplifier stage, the amplifier tube and photoelectric cell being illustrated diagrammatically as pure resistances; and Figure 4 is a chart showing the phase relations existing between the drive motor voltages.

Figure 1:
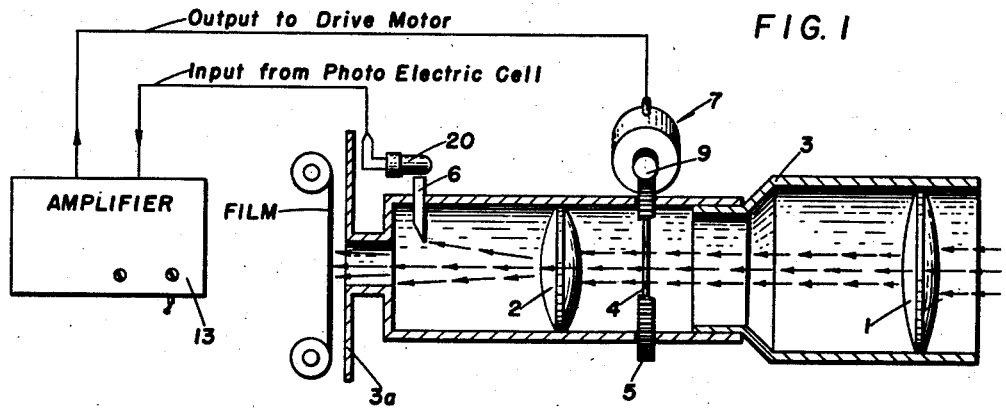
Figure 1 is a diagrammatic view showing the arrangement of the iris diaphragm, the photoelectric cell, the light probe, and, in block diagram only, the amplifier which is connected between the photoelectric cell and the motor.

Considered briefly, the invention consists of a light sampler, having a probe or pick-off in a telescopic lens adapter housing or lens mount, which supplies to a servo amplifier a signal proportional to the light received by the film. The servo amplifier drives a mechanism to adjust the iris diaphragm to a preselected stop setting. The arrangement makes it possible automatically to hold an exposure to an accuracy of ± .25 f stop under ordinary cine-theodolite tracking conditions. The arrangement can be installed in any lens mount where space will permit the insertion of the pick-off of the light sampler.

In the drawings, the numerals 1 and 2 indicate a pair of lenses contained in a telescopic lens mount 3 of a camera 3a. An iris diaphragm 4 is mounted between the lenses 1 and 2 and carries a ring gear 5 at its rim, said ring gear being rotatable for varying the adjustment of the iris diaphragm and thus controlling the passage of light from lens 1 to lens 2. Inasmuch as an iris of any desired construction may be used, it is not deemed necessary to furnish a detailed description of one herein.

The light sampler employed in the present invention includes a photoelectric cell, which will be mentioned hereinafter, and a pick-off or probe 6, of Lucite or other suitable translucid material. The probe 6 is fixed in the lens mount between the lens 2 and the camera 3a in any suitable manner and with its long dimension normal to the axis of said mount.

Figure 2:
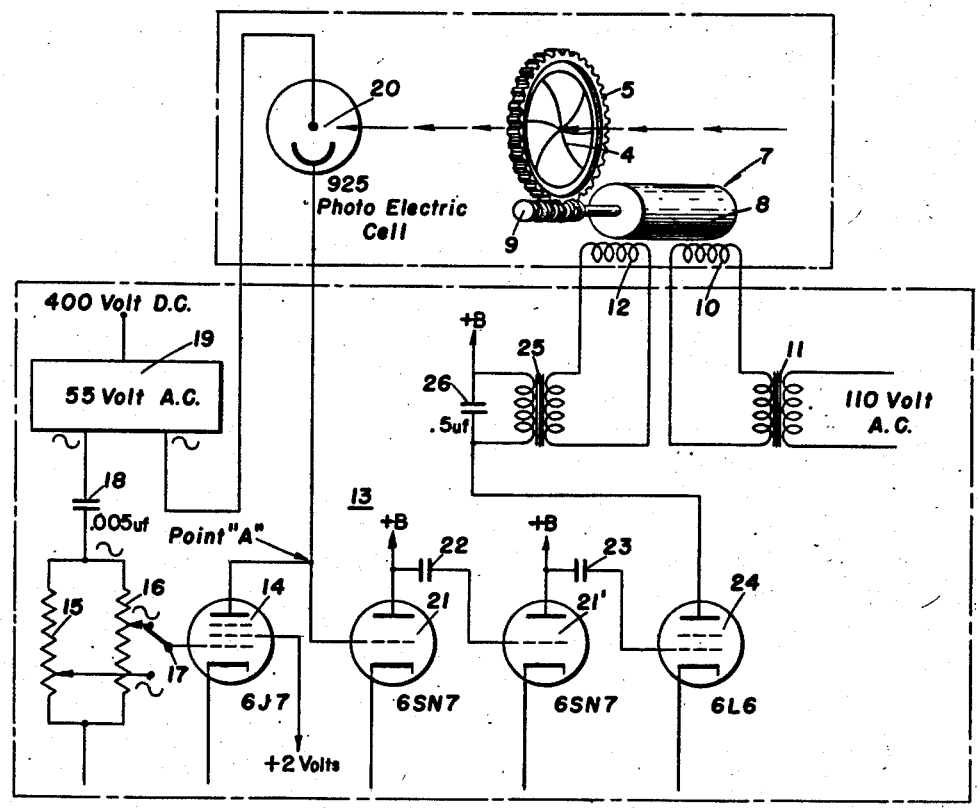
Figure 2 is a partial schematic view illustrating the wiring arrangement of the improved system and apparatus for automatically controlling an iris diaphragm.

A split phase alternating current motor is shown schematically at 7. As best seen in Fig. 2, said motor includes an armature 8 having a shaft which carries a worm 9 meshing with the ring gear 5 on the iris. Said motor also includes a motor field 10 which is connected to a source of alternating current, for example the usual 110 volt service line, through a suitable transformer 11. The motor 7 also includes a control field 12 which is connected to the output of an amplifier, shown in block diagram in Fig. 1 at 13.

The amplifier 13 includes an input stage, two intermediate stages and an output stage, and except for its input circuit in general, is conventional in arrangement. The input stage includes a pentode 14 having its control grid connected to either of a pair of voltage-divider type controls for regulating film speed, said controls being shown at 15 and 16 of the desired control. A switch 17 is provided for selection. Common terminals of the controls shown at 15 and 16 are connected through an isolating capacitor 18 to a current source 19, comprising a 55-volt A. C. signal superimposed upon a 400-volt D. C. plate supply. The source 19 is also connected to the anode of a photoelectric cell, or phototube, which is shown at 20, and, as will be explained in detail hereinafter, said cell 20 is connected in series with the pentode 14. Preferably the photoelectric cell 20 is of type 925, as marked on the drawing, although other suitable cell types may be substituted, if desired. The "type 925 phototube" is described in the R. C. A. Tube Handbook as having its peak sensitivity at 8000 A. The anode, or plate, of the pentode 14 is connected to the grid of one of the intermediate amplifier triodes, shown at 21. The other of said intermediate amplifier triodes, shown at 21', has its grid connected to the anode of the triode 21 through a coupling capacitor 22. The anode of the triode 21' is connected, through a coupling capacitor 23, to the input grid of an output tetrode 24, and the anode of said tube 24 is connected to the control field 12 through an output transformer 25.

From the above description it will be understood that the cell 20 is wired as the anode load of the pentode 14. The pentode is operated at a screen potential of approximately two volts and under this condition its anode resistance is very high, approximating that of the cell 20. With the 55 volt A. C. signal modulated 400 volt plate supply, the cell 20 and pentode 14 are operating in the saturation portions of their anode voltage-anode current curves, and therefore act as series filters to A. C. The A. C. voltage at the anode of the pentode 14 would be one half that at the anode of the cell 20, but this voltage is canceled by A. C. of the same phase fed in at the control grid of the pentode 14. The signal at point A (see Fig. 2) is therefore zero volts A. C. in the static condition.

The resistance of the photoelectric cell 20 varies inversely with the amount of light that strikes it. If there is an increase of light to the lens, the resistance of the cell will decrease. With less resistance above point A (Fig. 2) than below, more of the superimposed A. C. appears at point A than is canceled by the amplified signal from the pentode grid, bringing about an A. C. signal at point A in phase with that on the photoelectric cell anode. If less than the static amount of light reaches the photoelectric cell, its resistance increases, less A. C. tends to appear at point A and the amplifier signal from the grid of the pentode overcompensates, placing an A. C. signal at point A 180° out of phase with that on the anode of the cell 20. The A. C. signal at point A is amplified by the triode and tetrode to supply the control field 12.

The fields 10 and 12 of the motor 7 are 90° out of phase so that the direction of rotation of the armature will depend upon whether or not the control field leads or lags the motor field 10. The motor armature will rotate to open or close the iris diaphragm until the control field voltage is zero, at which point the motor armature will stop. The required 90° phase shift with respect to the motor field voltage is produced in part by the capacitors 22 and 23 and a .5 mfd., capacitor 26, which is connected in parallel with the primary winding of the output transformer 25.

The amount of signal fed to the grid of the pentode 14 determines the amount of A. C. that will be canceled at point A, and consequently the static point at which the motor will stop and the static amount of light the iris will admit. This point is adjusted for the film and shutter speed being used, the adjustment being taken care of by the controls 15 and 16 and the selector switch 17.

It is particularly desired to point out that, by placing the photoelectric cell in series with a pentode operating at a reduced screen potential, good gain for the pentode as an amplifier and optimum operation of the photoelectric cell are assured. Moreover, as the pentode and photoelectric cell have similar characteristics (voltage vs. current), placing them in series permits varying the voltage across the two in such a manner that the voltage across, for example, the pentode alone varies proportionally to the total voltage. Thus, it is possible to feed A. C. to the cell and the pentode and at the same time impress it upon the control grid of the pentode for producing an A. C. balance, and giving a null value of A. C. voltage at the anode of said pentode. The system, furthermore, provides an A. C. error signal which is proportional to the unbalance of light intensity. That is, the error signal will have one phase, for too little light, and an opposite phase, for too much light, for producing an A. C. error signal having the desired characteristics for an A. C. servo circuit.

By way of summary, by placing the pentode 14 in series with the photoelectric cell 20 and inserting an A. C. signal in series and at the same time impressing it on the pentode control grid, the conversion of the photoelectric cell current signal into voltage signal, the amplification of this signal, its modulation, and the balancing of the modulated signal against a standard value, in such a manner as to serve as a servo error signal at increased sensitivity over other methods, are accomplished.

What is claimed is:

1. In a system and apparatus for automatically controlling the admission of light, an iris diaphragm, a photoelectric cell, a probe for deflecting a portion of the light passing through the diaphragm to said cell, an amplifier having a pentode vacuum tube input stage and at least a second vacuum tube amplifier stage, a split phase motor including an armature having a shaft, a control field and a motor field, said control field being connected to the output of said amplifier and said motor field being designed for connection to a service line, means connecting said shaft to said diaphragm, and a source of supply voltage connected in series between the grid of the pentode and the plate of the photoelectric cell the plate of said pentode and the cathode of said cell being connected together and their common junction being connected to the input of said amplifier so that the output voltage from the amplifier will be caused to lead or lag in phase the voltage from the service line in accordance with variations in the intensity of light reaching the cell, for controlling the direction of rotation of the motor shaft, whereby the aperture of the iris diaphragm will be maintained at optimum for given light conditions.

2. In a system and apparatus for automatically setting an iris diaphragm, a photoelectric cell, a split phase motor having an armature, a motor field and a control field, a servo amplifier having a pentode, said cell being connected as the plate load of said pentode, said pentode operating at sub-normal screen potential whereby the resistances of said cell and pentode are caused to be similar, means for producing a modulated A. C. signal at the anode of said pentode, the resistance of said cell being varied in accordance with changes in the intensity of light striking it for determining the phase angle of the modulated A. C. signal, a tetrode connected to the pentode and having its output circuit connected with said control field, said tetrode energizing said motor control field by a voltage emanating from said pentode which either lags or leads the motor field voltage for controlling the direction of rotation of the motor armature, and an iris diaphragm mechanically connected with said motor armature and being shiftable thereby for controlling the amount of light reaching the cell.

3. In combination with a camera having an iris diaphragm, a system and apparatus for positioning the iris diaphragm for optimum photographic exposure under varying light conditions, including a photoelectric cell, a probe disposed to deflect a portion of the light beams passing through the iris diaphragm to said cell, a split phase motor having a shaft connected to the iris diaphragm for shifting said diaphragm, said motor having a control field and a motor field, a source of A. C. voltage connected to the said motor field, a servo amplifier having its output connected to the control field and having an input pentode, said photoelectric cell being connected at the anode load of said pentode, said pentode operating at reduced screen potential whereby its resistance will approximate that of said cell, and a source of voltage connected between the grid of the pentode and the plate of the photocell for modulating the pentode anode signal as the cell resistance changes, said cell resistance being varied inversely in accordance with changes of light intensity for producing a usable error signal at the pentode anode, said signal leading or lagging in phase the motor field voltage for controlling the direction of rotation of the motor shaft and thus the position of the iris diaphragm.

4. The combination recited in claim 3, including means for presetting for a chosen film and shutter speed the static point at which the the motor will stop and thus the static amount of light the iris diaphragm will admit.

5. The combination recited in claim 3, including means for presetting for a chosen film and shutter speed the static point at which the motor will stop and thus the static amount of light the iris diaphragm will admit, said means including an adjustable resistance connected between ground, the control grid of the pentode and the source of modulating voltage.

6. In a camera having an iris diaphragm, means for controlling said diaphragm for insuring optimum photographic exposure under varying light conditions, comprising a probe positioned behind said diaphragm to deflect part of the light passed by the diaphragm, a photoelectric cell mounted to receive light deflected from said probe, an amplifier having an input stage including a pentode, said cell being connected in series relation to said pentode, said pentode operating at sub-normal screen potential whereby its anode resistance will approximate that of the cell, a source of A. C. voltage for modulating the pentode anode voltage, said photoelectric cell constituting the anode load of said pentode and determining the phase of the voltage appearing at the anode of the pentode, a motor connected to and controlled by said amplifier, as to direction of rotation, in accordance with said phase, and mechanical means connecting the motor to the diaphragm, to adjust said diaphragm upon operation of the motor.

7. A system for automatically controlling the admission of light for exposing photographic films comprising an iris diaphragm, a probe positioned behind said diaphragm for deflecting a portion of the light passed by said diaphragm, a photoelectric cell positioned adjacent said probe to receive said deflected light, an amplifier having an input vacuum tube and at least one other vacuum tube stage, an electrical connection between the plate of said input vacuum tube and the cathode of said photoelectric cell, a voltage source providing a D. C. voltage having a superimposed A. C. voltage, said source being connected in series between the anode of the photoelectric cell and the grid of said input tube, the grid of the tube of said other stage being connected to the plate of said input tube, the impedances of said input tube and said photoelectric cell being substantially equal, and a split phase motor having an output shaft connected to said diaphragm, the control field of said motor being connected to said amplifier, whereby the output of said amplifier controls the amount and direction of rotation of said motor shaft to control the opening of said diaphragm.

HOWARD A. GRAY, Jr.

References Cited in the file of this patent

UNITED STATES PATENTS

| Number | Name | Date |
| --- | --- | --- |
| 1,919,182 | Fitz Gerald | July 18, 1933 |
| 1,934,484 | Camilli | Nov. 7, 1933 |
| 1,970,103 | Runaldue | Aug. 14, 1934 |
| 2,030,854 | Calver | Feb. 18, 1936 |
| 2,086,964 | Shepard | July 13, 1937 |

(Other references on following page)

UNITED STATES PATENTS

| Number | Name | Date |
|---|---|---|
| 2,140,355 | Gulliksen | Dec. 13, 1938 |
| 2,183,217 | Goldsmith | Dec. 12, 1939 |
| 2,184,016 | Mihalyi | Dec. 19, 1939 |
| 2,232,373 | Dorst | Feb. 18, 1941 |
| 2,238,762 | Whitaker | Apr. 15, 1941 |
| 2,388,609 | Ericsson | Nov. 6, 1945 |
| 2,412,424 | Rath | Dec. 10, 1946 |
| 2,421,476 | Belar | June 3, 1947 |
| 2,472,815 | Fleming | June 14, 1949 |
| 2,477,235 | Broido | July 26, 1949 |
| 2,534,769 | Hart | Dec. 19, 1950 |

FOREIGN PATENTS

| Number | Country | Date |
|---|---|---|
| 491,410 | Great Britain | Sept. 1, 1938 |